United States Patent [19]

Whiteley

[11] Patent Number: 4,788,800
[45] Date of Patent: Dec. 6, 1988

[54] FIRE STOP DEVICE

[75] Inventor: Joseph D. Whiteley, Guelph, Canada

[73] Assignee: Monsanto Canada Inc., Mississauga, Canada

[21] Appl. No.: 67,543

[22] Filed: Jun. 29, 1987

[30] Foreign Application Priority Data

Jul. 17, 1986 [CA] Canada ................................. 514026

[51] Int. Cl.[4] ............................................... E04B 5/48
[52] U.S. Cl. ........................................... 52/1; 52/220; 52/232; 137/77
[58] Field of Search ....................... 52/1, 98, 232, 220; 49/3, 4, 7, 8; 169/42, 57; 137/72, 75, 67, 77

[56] References Cited

U.S. PATENT DOCUMENTS

| 2,416,284 | 2/1947 | Brown | 52/1 |
|---|---|---|---|
| 3,462,890 | 8/1969 | Blumenkranz | 52/1 |
| 3,487,419 | 12/1969 | Heyerly | 49/7 |
| 3,678,634 | 7/1972 | Wise | 52/1 |
| 3,726,050 | 4/1973 | Wise | 52/1 |
| 4,136,707 | 1/1979 | Gaillot et al. | |

FOREIGN PATENT DOCUMENTS

| WO83/03553 | 10/1983 | PCT Int'l Appl. . |
| 973126 | 10/1964 | United Kingdom . |
| 1063289 | 3/1967 | United Kingdom . |
| 1203218 | 8/1970 | United Kingdom . |
| 1338828 | 11/1973 | United Kingdom . |
| 1356719 | 6/1974 | United Kingdom . |
| 2150254 | 5/1987 | United Kingdom . |

Primary Examiner—John E. Murtagh
Attorney, Agent, or Firm—McFadden, Fincham & Co.

[57] ABSTRACT

There is provided a first stop device having a closure for a conduit passing through an aperture extending through a wall, floor or the like. According to this invention, the conduit passing through the aperture is formed of a low melting point, fugitive metal having a relatively short melting point, e.g., a bismuth-based metallic alloy or lead-tin alloy. A closure housing is disposed parallel to the wall, floor or the like, with one end of the closure housing being disposed adjacent to one surface of the conduit. A fire-resistant closure plate is slidably mounted within the closure housing, the closure plate being spring biased to be in contact with that surface of the conduit. In the event of a fire, at least the portion of the conduit which is in contact with the fire-resistant closure plate is melted almost instantaneously to be in liquid form and so becomes dissipated. This allows the fire-resistant closure plate to be urged, by the bias spring, completely across the aperture in the wall floor or the like. Means are also provided for normally urging the closure means in the second position. Thus normally combustible thermoplastic conduits can be used up to the fire stop and be connected to each end of the conduit without affecting the operation of the fire stop device.

7 Claims, 4 Drawing Sheets

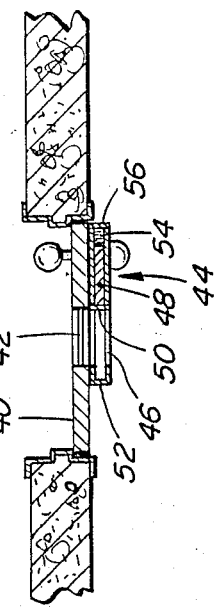
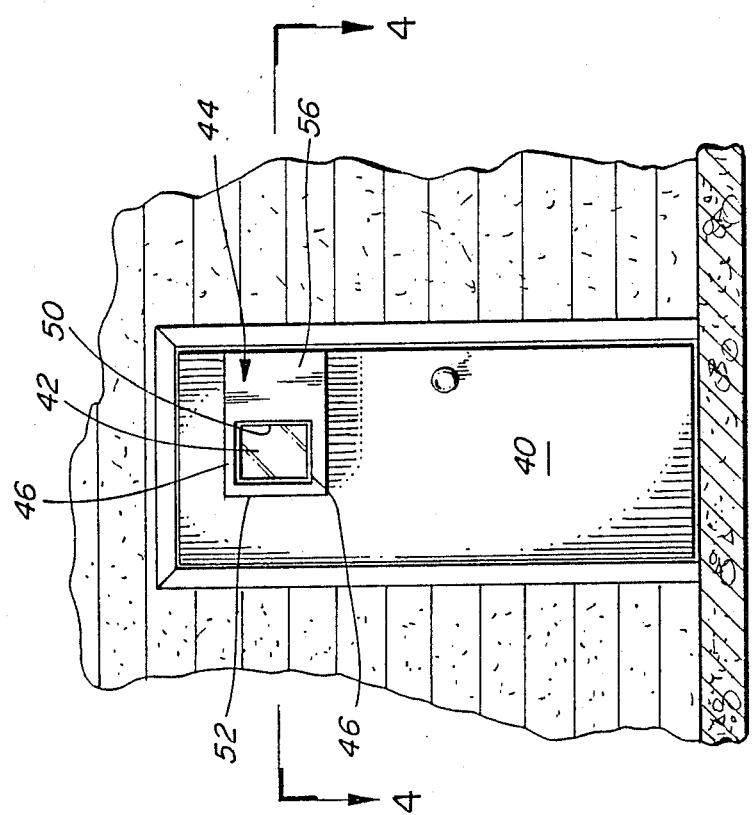

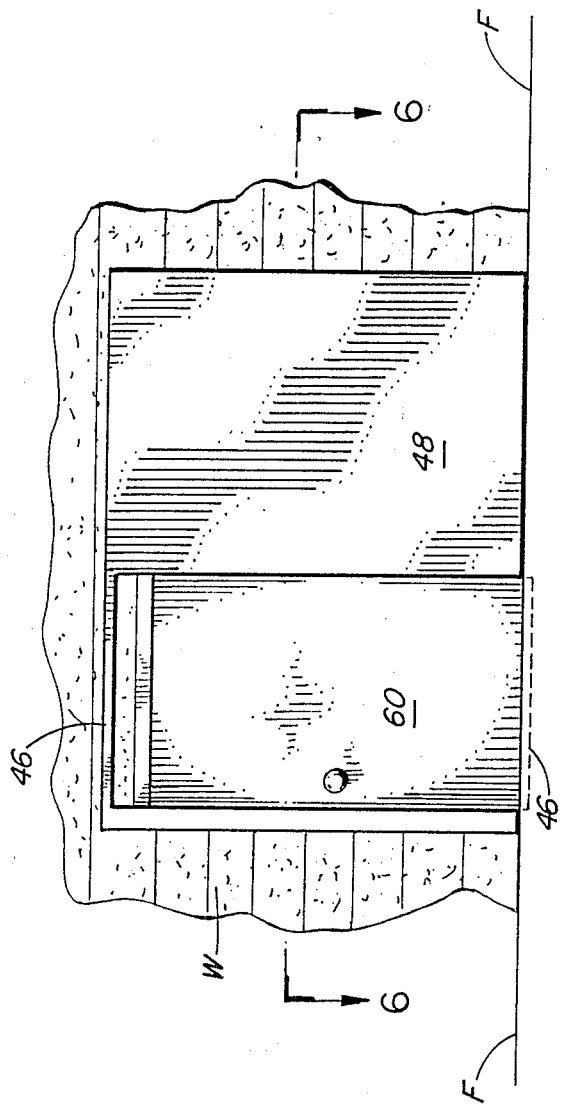
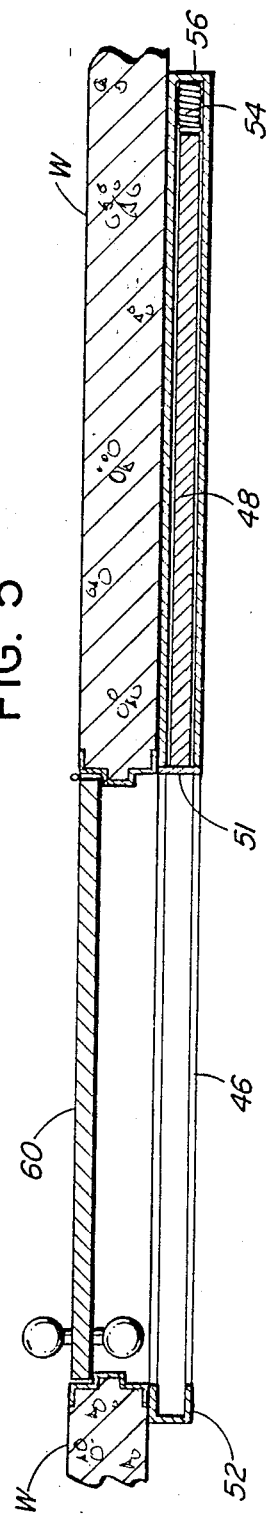
FIG. 5
FIG. 6

FIRE STOP DEVICE

This invention relates to fire stop devices operable in a vertical, inclined or horizontal orientation.

Certain types of fire stop devices are known, e.g. U.S. Pat. No. 4,136,707 Jan. 30, 1979 teaches a fire-resisting device for pipes between floors or walls. A first plastic pipe extends inwardly of a wall aperture to meet a sleeve of fusible material located within the wall and a further plastic pipe mates on the opposed wall side with the sleeve.

A pair of swinging gates held in place by the plastic pipes are released when the plastic piping is consumed by a fire, and the gates then close with the release of a swellable mass to block-off the opening behind the gates. Such an arrangement is only practical for vertical applications as the gates depend on gravity for closure once the plastic conduits are consumed. Modifications are required as taught to use the arrangement in an other than vertical orientation.

U.S. Pat. No. 3,678,634, July 25, 1972 discloses a fire stop where a plastic pipe extends through a wall; a pair of opposed tensioned gates are mounted on the side of the wall bear against the plastic pipe by means of coil springs. In use, when fire contacts the plastic pipes, the pipes will soften and collapse due to the urging of the gates against the softened plastic; the plastic pipe is "squeezed" in the softened areas so that sections of the plastic pipe come together by the force of the opposing gates (FIG. 5).

U.S. Pat. No. 3,462,890 teaches a fire stop with a sliding blade arrangement to cut through a plastic pipe extending through a fire-wall, when softened by the heat. In one form, a weight is used to provide force on a plastic pipe to cut it; in another form, the blade is constantly urged against the plastic pipe by means of a tension spring.

Fire stops have also been proposed where a standard "wye" plumbing fitting is provided with a metallic plug in a branch outlet, the plug being fitted by a thermoplastic harness which upon melting, allows it to fall into the flow path to block the pipe opening. Special spacing and installation requirements are needed to make this device effective.

Another proposed device uses an intumescent type reaction to heat as a fire stop, requiring expensive specialized chemicals or materials. Such devices are heat sensitive and also generally sensitive to carbon dioxide and/or moisture sometimes becoming prematurely inoperable.

Disadvantages of fire stops (as in the above U.S. Patents) require thermoplastic pipes to collapse or to be severed during a fire or which use intumescent type reactions to heat, and that they can fail due to long storage as well as being susceptible to ordinary atmospheric conditions. Many prior art devices also only function in either a vertical or horizontal mode;

With the introduction of thermoplastic conduits, it has been proposed (e.g. above U.S. patents) to permit such thermoplastic conduits to extend through walls or floors and form a continuation of the plastic conduit or duct that is otherwise used. However, many building codes prohibit this, eliminating the possibility that the thermoplastic conduit (normally a combustible material) be continuous where a fire separation is required even though a fire stop device is used, since flames and combustion products can pass through such fire stop devices particularly in a horizontal fire separation or when there is a pressure differential across the fire separation zone. In other case, the disadvantages of uilizing a continuous thermoplastic material through a fire separation zone are due to the softening characteristics of the thermoplastic materials, based on the location and intensity of a potential fire, which are critical to the operation of a fire stop device; it is well known that a thermoplastic conduit may collapse in a non-symmetrical manner thus causing the closing blades or the like of the fire stop device to become misaligned and prevent full closure.

The softening point of thermoplastic materials extends over a wide range—e.g. 90° C. to 315° C., which provides an undesirable time delay before the fire stop device becomes actuated. Also, when the thermoplastic material softens, and before it burns, fire stop devices may compress the softened thermoplastic conduit into a large mass by virtue of the softened material becoming deformed (also due to the action of gravity) and unless the fire stop device is capable of severing the mass of softened material, combustion of the thermoplastic material may actually be transmitted along the length of the thermoplastic material thus by-passing the fire stop.

Most thermoplastic pipe materials have inherent properties so that they have long term "creep" due to continuous stress; and physical failure (even without a fire) can occur. Expensive repairs or replacement are required, and a device may fail to serve its primary function when needed.

The use of thermoplastic materials e.g. ABS, PVC, or the like in conduits for residential, industrial or commercial buildings is increasing. There is thus a need for a fire stop system meeting the following parameters: operable in any orientation;

meet building codes so that no combustible material is present in the fire separation zone and negligible amounts in the balance in other parts with the further requirement that any large mass of combustible thermoplastic material must be terminated prior to reaching a fire separation;

must have a proper action over a wide temperature range regardless of the condition or age of the thermoplastic material used in the conduits;

and further, must not be influenced by any long term creep or environmental characteristics of the installation which would otherwise impair their function.

In view of the diversity of application of fire stop devices, e.g. in plastic conduits carrying telephone or communication cables (e.g., optic fibre cables or the like) or even in pressurized conduits, plumbing conduits, e.g. sanitary drain, water supply, etc., air-conditioning conduits, etc. such fire stop devices may not only have to operate under pressure, but also provide an effective stoppage of the flow of the contents being transported or carried by the conduits.

Various codes are provided for fire stops; e.g. plastic conduits may be prohibited in or between walls, exiting from a wall, etc. due to the potential fire spread through the conduit and lack of an effective fire stop. It would therefore be desirable if an effective fire stop could be provided to permit plastic conduits to extend between walls.

This invention provides an improved fire stop device which, due to the nature of the material and the structure employed to ensure that positive control is obtained to permit the device to function without the problems associated with, e.g., the above-described arrangement having thermoplastic materials.

One embodiment provides for a building structure having a structural opening requiring fire stop protection. The invention comprises a fire stop device comprising (a) a cylindrical tubular conduit formed of a low-boiling-point, fugitive metal having a relatively short melting point, the conduit being adapted to extend completely through an aperture in a wall, floor or the like and to provide means for connection to a plastic pipe at each side of the wall; (b) a closure housing disposed parallel to the wall, floor or the like with one end thereof being disposed adjacent to one surface of the cylindrical tubular conduit; and (c) a fire-resistant closure plate slidably mounted within the closure housing, the closure plate being spring-biased to be in contact with the same surface of the cylindrical tubular conduit; whereby, in the event of fire, at least the portion of the cylindrical tubular conduit which is in contact with the fire-resistant closure plate is melted completely to liquid form relatively quickly and is thus dissipated, thereby allowing the fire-resistant closure plate to be urged completely across the aperture in the wall, floor or the like.

In another embodiment, the invention comprises a firestop device comprising: (a) a cylindrical tubular conduit fomed of a low-boiling-point, fugitive metal having a relatively short melting point, the conduit being adapted to extend completely through a hole in a wall, floor or the like and to provide means for connection to a plastic pipe at each side of the wall, floor or the like; (b) a closure housing disposed parallel to the wall, floor or the like with one end thereof being disposed adjacent to one surface of the cylindrical tubular conduit, the closure plate having an aperture therethrough which is of substantially the same diameter as that of the cylindrical tubular conduit, the cylindrical tubular conduit also being disposed in the aperture in the closure housing; and (c) a fire-resistant closure plate slidably mounted within the closure housing, the closure plate being spring-biased to be in contact with the same surface of the cylindrical tubular conduit; whereby, in the event of a fire, at least the portion of the cylindrical tubular conduit which is in contact with the fire-resistant closure plate is melted completely to liquid form relatively quickly and is thus dissipated, thereby allowing the fire-resistant closure plate to be urged completely across the aperture in the wall, floor or the like and to be in seating engagement with a seat provided in a channel within the closure housing.

The fugitive, low boiling point metal having a relatively short melting point may be a bismuth-based alloy, or a lead-tin alloy. The spring bias can be provided by a compression spring or a tension spring.

In the above devices applicant has found that by employing a conduit formed of a low boiling point, fugitive metal having a relatively short melting point to retain the movable closure or barrier means in a retracted or first position, the closure means can act in a positive manner to seal off the aperture and thus provide a positive fire stop; in this way, the more desirable thermoplastic piping which can be used for conduits, can be brought right up to or adjacent an aperture and indeed, can be coupled to the device of the present invention.

Preferably, the closure housings means surrounds, at least in part, an aperture which extends through a fire wall; it may comprise a fire resistant first housing surrounding the aperture with an optional extension through the aperture of the fire wall. Another form comprises a complete housing surrounding the aperture, although the housing may only partially surround the actual opening depending on the type of movable closure means.

The conduit formed of a low boiling point, fugitive metal having a relatively short melting point retains the closure means under normal conditions in a non-operative condition, and releases the movable closure to move to a closed position across the aperture in the fire wall in the event of a fire. Thus, the conduit formed of a low boiling point, fugitive metal having a relatively short melting point provides a conduit through the fire wall under normal conditions but, in the event of fire, provides a complete closure of the aperture through the fire wall.

In contrast to the prior art, the quantity of heat-dispersible means forming the housing is such that a minimum of material may be employed. The material used may be e.g., a metallic alloy or other substance which melts at low temperature. The particular type of alloy employed may vary in composition depending on the particular application; typically, e.g. bismuth based alloys containing various ratios of bismuth, and alloying materials such as lead, tin, cadmium, antimony and the like can be used as can lead-tin alloys containing alloying elements of e.g., antimony in various ratios. Typical of such dispersible products which may be utilized are those marketed under the Trade Marks "Cerrobend"; "Cerromatriax"; "Cerrocast"; "Cerrotru" and the like.

It is essential that the conduit be formed of a low-boiling point, fugitive metal having a relatively short melting point and which becomes liquid and hence becomes dissipated when heated above its melting point, and that the liquid forming the metal be essentially non-combustible. This is characteristic of the above type of metallic substances where at normal temperatures, they are solids which can be shaped into a desired form. Such metals also have relatively short melting points so that when heated to the melting point to become dispersible, they change from a solid to a liquid and are capable of dissipating to thus become non-sustainable and permit the closure means to function.

Depending on the installation the particular low-boiling point metal having a relatively short melting point will be selected to have a different melting point for different applications. In most residential applications, the heat-disposable material will melt below e.g. 175° C.; in the case of industrial applications the heat-disposable means will melt at e.g. 230° C. or below due to higher temperatures normally encountered in the operating environment.

The heat disposable and dispersible component may have various forms and shapes; in the case of a fire stop in a fire door, it may be a plurality of pins associated with the building structure and be directly or indirectly mounted relative thereto; e.g. one or more brackets of heat-disposable material may be used to support or retain a door in a first position. For a window, one or mroe pins secured to a wall may support the closure or barrier. The barrier restraining means can also be an angle bar e.g. an "L-shaped" member. Normally, low temperature melting substances of the type described possess good mechanical strength to retain weight; the amount of heat-disposable material employed can be minimized so it is sufficient to retain not only the closure or barrier but also counter the force of the means urging the barrier into a closed position.

One feature of the present device is that the material which is low melting must be "disposable"—that is, such material must, when heated, form a flowable form, e.g., liquid in which the liquid dissipates from around the aperture through the fire wall. In this manner, the material does not hinder the closure of the closure means. Likewise, by using a low melting alloy, once subjected to use, the material is disposable so that a "fail-safe" system can be achieved so that the device cannot be put back into operation without installation of a new component.

In forming a housing for the conduit formed of a low boiling point, fugitive metal having a relatively short melting point, its shape can be formulated to modify the heat response of the device of the present invention by utilizing various metals to form the low temperature melting substances or alloy or by the size of the housing which will affect the heat pick-up—and consequently, its sensitivity. The housing may be modified to provide a collar or other point of attachment for any thermoplastic conduit extending up to the housing, so that the thermoplastic material does not enter into the fire wall zone.

The closure/barrier means can be any suitable form operating in conjunction with the heat-disposable component so as to effectively close the aperture in the fire stop when released by the heat-disposable material. Thus, a gate or plate dimensioned to cover the aperture, when moved from its first restrained position to a second operative position can be used. The gate/plate may be within a fire-resistant housing which may partially surround or be associated with a housing formed of the heat disposable material; the housing for the closure means protects it against accidental damage or jamming during installation and use, and functions to guide the closure means upon activation into the desired position.

The closure plate housing and the closure plate can be of any suitable material which meets the necessary requirements e.g. fire resistant or non-combustible materials—these are generally rigid and capable of withstanding the heat encountered during a fire. Typically, sheet metal e.g. steel, engineering type thermoplastics or thermosets can be used.

The housing can have guide means for the closure plate to assist it during movement from the first to second positions, such as channels accommodating the closure plate. The guide means may include apertures permitting the heat disposable material, when rendered flowable by a fire, to escape from the channels.

For "universal" application—i.e. a horizontal, vertical or angled disposition, means for urging the closure means into contact with the conduit formed of a low boiling point, fugitive metal having a relatively short melting point is provided. This can be spring such as compression or tension spring or other loading means such as hydraulic or pneumatic accumulators, Bellville washers, etc. Weights may be connected to or associated with the closure means to normally urge the closure means against the fusible means.

Where the barrier/closure is a slidable barrier mounted above a door a spring may not be required as the weight of the barrier, when the heat disposable means is rendered non-sustainable, will be sufficient to permit it to "fall" into position—generally using guides such as channels located beside the door opening. Conversely, where barrier means are employed for doors or openings, and even in the case of barrier means for safety windows, lateral or side mounting of the fire stop devices can be used with a spring to displace the barrier means from a first inoperative position to a second operative position.

When the fire stop is in an air-conditioning duct or the like, the barrier/closure means forming an airflow interruption device will usually be mounted externally. The barrier can conform to the duct contour and be relatively tight fitting (or not, as required) as, for example, by applying a seat against which the barrier is adapted to be placed in juxtaposition.

Having thus generally described the invention, reference is made to the accompanying drawings illustrating preferred embodiments:

FIG. 3 is a front elevation of a fire stop device in a fire door;

FIG. 4 is a section on 4—4 of FIG. 3;

FIG. 5 is a front elevation of a fire stop device in a door opening in a wall;

FIG. 6 is a section on 6—6 of FIG. 5; and

Figure 1:
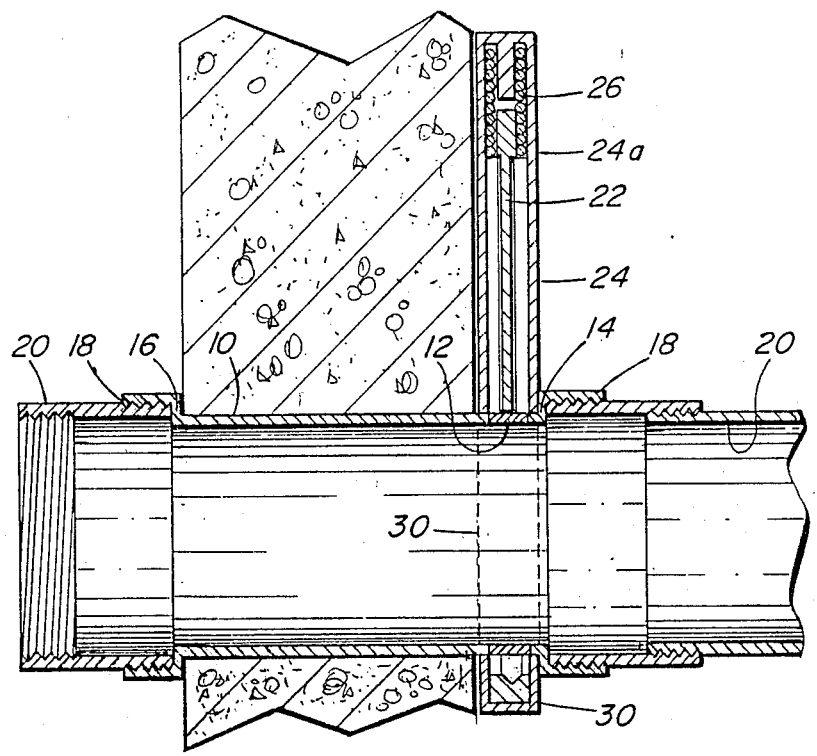
FIG. 1 is a cross sectional view through a fire stop device of the present invention in a fire separation wall.

As shown in FIG. 1 a device 10 of the present invention of a fusible alloy material e.g. lead-antimony alloy, is shown in a cylindrical tube form and passes through an aperture in a fire separation zone. Tube 10 forms a housing projecting beyond one end of the wall to form an engagement surface 12 with a further extension 14 forming a shoulder for a thermoplastic coupling assembly. Pressure seals may optionally be included in the assemlby to allow leak-proof passage of fluids, e.g. gases or liquids.

At its opposed end housing 10 has extension 16 to mount a further coupling or a thermoplastic fitting connection. Extensions 14 and 16 may have coupling 18 dimensioned to receive a conduit 20 of thermoplastic material, by mechanical or adhesive means.

Operating with the above is a closure assembly having a closure plate 22 mounted in housing 24. Housing 24, includes upper portion 24a, at least partially surrounding housing 10, of fusible material so that closure member 22 engages surface 12 of the fusible member.

Compression spring 26 mounted in housing 24 engages one end of the housing and also closure plate 22 for urging closure plate 22 into juxtaposition with fusible material 12.

Extension 30 of housing 24 surrounds fusible material 12 in the form of a channel for guiding and receiving closure plate 22 when it is activated by dispersal of the heat-fusible material 12 due to a fire. The bottom portion of the housing may include a seat 32 to receive closure plate 22; housing extension 30 may also include a plurality of apertures (not shown) to permit any heat-fusible material to disperse when it liquifies. Housing 24, extension 30, spring 26 and all other like components are intended to withstand the normal effects of a fire and are made of e.g. steel.

With the above arrangement, thermoplastic conduits of, e.g. ABS, PVC, high density polyethylene, low density polyethylene, and various types of rubbers (or thermoset compounds) can now be employed with the fire stops of the present invention, right up to the point where the fire stop is located adjacent e.g. a fire separation wall.

In the form illustrated, the heat-fusible alloy is a conduit 10 with extensions 12; that portion of the conduit extending through the fire separation wall need not be included or can be replaced with a conventional metallic or other suitable material conduit. The device is mounted against the fire separation wall by e.g., screws or the like which affix it to the fire separation wall. At the opposed side of the fire separation wall, conventional coupling means may be provided for mounting a plastic conduit up to the point where the conduit enters the opening through the fire separation wall with a connection to the dispersible metal conduit in the fire separation wall.

FIGS. 3 and 4 show a fire door 40 where e.g. a building wall structure has a conventional fire door with a conventional glass window 42. Fire-stop device 44 is provided for a window 42 which may be mounted adjacent it or can be installed vertically above or below the window 42, as long as it is arranged to protect the glass 42 during a fire.

Fire-stop 44 is mounted by a pair of spaced apart guide channels 46 provided on either lateral side. A barrier of fire resistant sheet material (e.g. metal plate) 48 is adapted to slide in channels 46 between a first non-operating position (as in FIG. 3) and a second operating position.

One or more (two being illustrated) restraining means 50 in the form of pins are provided in the door 40 adjacent window 42 and against which the fire-stop barrier 48 normally abuts. Pins 50 of a self-sustaining form are composed of the heat disposable low temperature melting metallic alloy material, as described above. Pins 50 may be e.g. cylindrical rods mounted directly or indirectly to door 40 but other forms may also be employed. In the event of a fire, the dispersible metallic alloy melts at a temperature below e.g., 450° F., and becomes dispersible into a non-sustaining form to release barrier 48 from its non-protecting position so that it may slide in front of the glass.

A channel 52 may be provided against door 40 to receive barrier 48 when in the operative position—thus providing stop means for positioning barrier 48 in a correct position.

Barrier 48 may have positive means for urging it against pins 50 and when the latter have dissipated due to heat generated by fire, into a closed or safety position in front of the glass in channel 52; thus, compression springs 54 in housing 56 can bear against the surface of barrier 48 to urge it against pins 50. Two or more such springs may be employed depending on the pressure-loading requirements for any given size of barrier.

In FIGS. 5 and 6, the fire-stop device is utilized to protect a complete door; in these Figures similar components are designated by similar reference numerals. Such an arrangement, as in an industrial or commercial building, has a door opening (with an optional door 60) in a wall W; it may have opposed steel channels or angle bars 46. A fire-stop barrier 48 is mounted adjacent door 40; in place of two pins 50 as in FIG. 4; either a plurality of such pins may be employed or as shown, a self-sustaining strip 51 of the metallic alloy of a thickness and size capable of restraining the barrier 48 is mounted on the wall against which the barrier 48 rests in its non-functional position (FIG. 6). No bottom channel is required in this arrangement to support 48 in a closed position as typically the floor F will function for this purpose.

Figure 2:
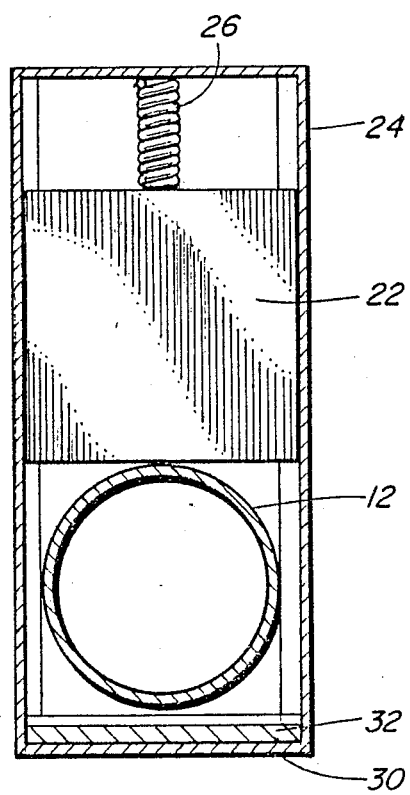
FIG. 2 is an end elevation showing the device of the present invention.
Figure 7:
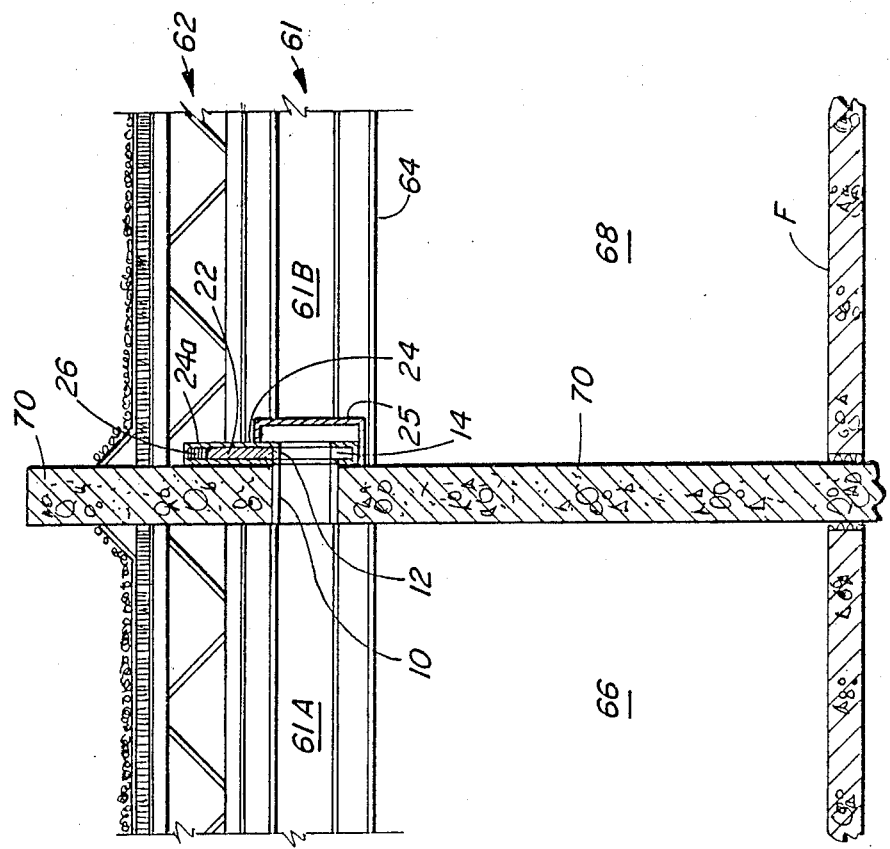
FIG. 7 is a front elevation partially in crossection of an air-conditioning system having the fire stop device.

In FIG. 7, the fire stop device is in a ventilation system for buildings or the like. Thus, air-conditioning duct 61 carrying air is typically located between a roof assembly 62 and a ceiling 64. To meet different requirements, it is necessary to provide a fire stop between two adjacent building sections, or in other cases, between two adjacent rooms 66 and 68, otherwise separated by means of a wall 70. For this purpose, the fire stop device employs the structure illustrated in greater detail in FIGS. 1 and 2. Thus, adjacent sections of the air-conditioning duct 61A and 61B are spaced apart by a coupling 10 (FIG. 1) which may be employed for joining the sections 61A and 61B; the fire stop device is otherwise contained in a housing 24 mounted externally and above ducts 61. A housing 25 may enclose the sections 61A and 61B and extend on both sides of housing 24. The above device functions as described in FIG. 1 so that the heat disposable material, upon being melted, will permit barrier 22 to pass between the duct sections 61A and 61B to close off the flow of air therethrough.

The arrangement of FIG. 7 may also employ electrically implanted or embedded heating means surrounding the conduit 10 joining the duct sections, which can be actuated from a remote position, to automatically cause the heat disposable material to be dissipated and permit automatic closure of the barrier to shut-down the air-conditioning system. Alternatively, any heating means employed can be mounted interiorly or exteriorly of the conduit in place of being embedded in the conduit.

In plumbing applications, the above described fire-stop device may be used in, e.g., multi-storey buildings, where it is desirable to isolate communication not only between adjacent units on the same floor but also between adjacent floors in the same building; thus the device can be employed with conventional plumbing systems to provide a fire stop at plumbing junctions at floor or wall levels.

The device can also be employed in, e.g. doors or other like sections in factories where windows are used. At present, for fire protection, heavy metal shutters are utilized to protect doors with windows; in place of such shutters, the device herein may be automatically released in the event of a fire thus eliminating fairly heavy structures and making such installations more economical.

Applicant's device can also be combined with secondary shut-offs in industrial conduits carrying industrial fluids where the heat-dispersible means can be provided with heat-inducing wiring (either externally or internally of the heat-disposable means) which may be thermally, manually or automatically activated by remote or direct control means. Thus, in a building having the closure devices selected fire stops (or all of them) may be provided with heat conductive wiring to cause the heat-disposable means to become non-self-sustaining when desired.

The device may also be modified by including severing means for cutting, telephone or communication lines where they are installed through a fire separation. Upon activation of the closure means, a knife-blade attached to the closure means can thus sever such lines and provide an effective seal without interference from wires passing through the fire separation zone. Alternatively, the closure means may directly incorporate a knife so that, e.g., its leading edge can sever any wires.

I claim:

1. A fire stop device comprising: (a) a cylindrical tubular conduit formed of a low-boiling-point, fugitive metal having relatively short melting point, said conduit being adapted to extend completely through a hole in wall, floor or the like, connection means at each end of said conduit for connection to a plastic plate at each side of said wall, floor or the like; (b) a closure housing disposed parallel to said wall, floor or the like with one end thereof being disposed adjacent to one surface of said cylindrical tubular conduit, said closure housing having an aperture therethrough which is of substantially the same diameter as that of said cylindrical tubular conduit, said cylindrical tubular conduit also being disposed in said aperture in said closure housing; and (c) a fire-resistant closure plate slidably mounted within said closure housing for movement from one end to the other end, said closure plate being sprung-biased to be in contact with the said surface of said cylindrical tubular conduit; said closure housing including a guiding channel at each side of said closure plate and a seat at said other end; whereby, in the event of a fire, at least the portion of said cylindrical tubular conduit which is in contact with said fire-resistant closure plate is melted to liquid form and is thus dissipated, thereby allowing said fire-resistant closure plate to be urged completely across said hole in said wall, floor or the like and to be seating engagement with said seat.

2. The firestop device of claim 1, including guide means in said closure housing to assist the sliding movement of said fire-resistant closure plate.

3. The firestop device of claim 1, wherein said low-boiling-point metal is a bismuth-based alloy.

4. The firestop device of claim 1 wherein said low-boiling-point metal is a lead-tin based alloy.

5. The firestop device of claim 1, wherein said spring bias means comprises a compression spring.

6. The firestop device of claim 1, in combination with a wall, floor or the like of a building having a structural opening requiring fire-stop protection.

7. The firestop device of claim 6, wherein said wall, floor or the like has a door assembly associated therewith, and wherein said door assembly includes said firestop device.

* * * * *